United States Patent
Okada et al.

(10) Patent No.: US 12,214,407 B2
(45) Date of Patent: Feb. 4, 2025

(54) PRESS BRAKE

(71) Applicants: Kawasaki Jukogyo Kabushiki Kaisha, Kobe (JP); LVD Company nv, Gullegem (BE)

(72) Inventors: Hideki Okada, Kobe (JP); Wataru Hirabayashi, Kobe (JP); Kristof Tyvaert, Gullegem (BE); Alexander Cornelus, Gullegem (BE)

(73) Assignees: KAWASAKI JOKOGYO KABUSXIXI KAISMA, Kobe (JP); LVD COMPANY NV, Gullegem (BE)

( * ) Notice: Subject to any disclaimer, the term of this patent is extended or adjusted under 35 U.S.C. 154(b) by 43 days.

(21) Appl. No.: 17/563,078

(22) Filed: Dec. 28, 2021

(65) Prior Publication Data

US 2022/0118496 A1 Apr. 21, 2022

Related U.S. Application Data

(63) Continuation of application No. PCT/JP2020/025398, filed on Jun. 26, 2020.

(30) Foreign Application Priority Data

Jun. 28, 2019 (JP) .................................. 2019-122091

(51) Int. Cl.
*B21D 5/02* (2006.01)
*B30B 15/02* (2006.01)
(Continued)

(52) U.S. Cl.
CPC ............. *B21D 5/0272* (2013.01); *B21D 5/02* (2013.01); *B30B 15/02* (2013.01); *B30B 15/14* (2013.01); *B30B 15/26* (2013.01)

(58) Field of Classification Search
CPC .......... B21D 5/004; B21D 5/006; B21D 5/02; B21D 5/0272; B21D 5/0209;
(Continued)

(56) References Cited

U.S. PATENT DOCUMENTS 5,062,283 A * 11/1991 Miyagawa ............... B21D 5/02
72/18.1
5,899,103 A * 5/1999 Ooenoki ................... B21D 5/02
72/389.5
(Continued)

FOREIGN PATENT DOCUMENTS

JP 3394141 B2 4/2003
JP 2012206136 A * 10/2012 ............... B21D 5/02
(Continued)

*Primary Examiner* — Debra M Sullivan
*Assistant Examiner* — Matthew Stephens
(74) *Attorney, Agent, or Firm* — XSENSUS LLP

(57) ABSTRACT

There is provided a press brake that improves bending accuracy of a partial bending method. The press brake includes: a conveying mechanism that intermittently conveys a workpiece; a die; a punch; a crowning mechanism; a bending amount measuring device; and a control device. The control device presses an end portion of the workpiece in a conveying direction by the punch and conveys the workpiece by the conveying mechanism until the pressed portion enters into a measurement range of the bending amount measuring device. The control device drives the crowning mechanism so as to correct a crowning amount in accordance with a difference between a middle bending amount and an end bending amount measured by the bending amount measuring device.

8 Claims, 8 Drawing Sheets

(51) Int. Cl.
*B30B 15/14* (2006.01)
*B30B 15/26* (2006.01)

(58) Field of Classification Search
CPC . B30B 15/0029; B30B 15/007; B30B 15/044; B30B 15/14; B30B 15/148; B30B 15/26
See application file for complete search history.

(56) References Cited

U.S. PATENT DOCUMENTS

| | | | |
|---|---|---|---|
| 6,189,364 | B1 | 2/2001 | Takada |
| 6,192,732 | B1* | 2/2001 | Kojima ............... B21D 5/02 72/389.5 |
| 2015/0292853 | A1* | 10/2015 | Auzinger ............. G01B 5/06 72/18.1 |
| 2021/0086245 | A1* | 3/2021 | Guernsey ............ B21D 5/02 72/18.1 |
| 2022/0072596 | A1* | 3/2022 | Wilken ............... B21D 5/01 72/18.1 |

FOREIGN PATENT DOCUMENTS

| | | |
|---|---|---|
| JP | 2016-59935 A | 4/2016 |
| WO | 2013/167803 A1 | 11/2013 |

\* cited by examiner

PRESS BRAKE

CROSS-REFERENCE TO RELATED APPLICATIONS

The present application is a bypass continuation of PCT Filing PCT/JP2020/025398, filed Jun. 26, 2020, which claims priority to JP 2019-122091, filed Jun. 28, 2019, both of which are incorporated by reference in their entirety.

BACKGROUND OF THE INVENTION

1. Field of the Invention

The present disclosure relates to a press brake that subjects a workpiece to bending.

2. Description of the Related Art

As disclosed in Japanese Laid-Open Patent Application Publication No. 2016-059935, for example, it is known that a so-called partial bending method (typical air bending method) is used when subjecting a workpiece to multistage bending with a press brake. The partial bending method is a method in which when pressing the workpiece with a punch, the workpiece is bent in a state where the workpiece is not brought into contact with the bottom of a groove of a die, and a rear surface of the workpiece floats in the groove. Therefore, any curvature can be given to the workpiece by adjusting a pressing amount of the punch. As other methods, there are a bottoming method and a coining method. According to these methods, the workpiece is brought into contact with the bottom of the groove of the die by the pressing of the punch.

SUMMARY OF THE INVENTION

An object of the present disclosure is to improve bending accuracy of multistage bending.

A press brake according to one aspect of the present disclosure is a press brake that performs bending with respect to a workpiece by a die and a punch. The press brake includes: a die that supports a rear surface of the workpiece; a punch that is arranged so as to be opposed to the die and moves in an upper-lower direction relative to the die to press a front surface of the workpiece; a crowning mechanism that changes a crowning amount that is an amount of upward projection of a middle portion of the die relative to both end portions of the die in a die longitudinal direction; a bending amount measuring device that measures a middle bending amount and end bending amounts, the middle bending amount being a bending amount of a width direction middle portion of the workpiece, the end bending amounts being bending amounts of width direction end portions of the workpiece; and processing circuitry. The processing circuitry acquires from the bending amount measuring device the middle bending amount and the end bending amounts of the workpiece that has been subjected to the bending by the die and the punch. The processing circuitry corrects the crowning amount in accordance with a difference between a shortage of the middle bending amount from a target bending amount and a shortage of each end bending amount from the target bending amount and drives the crowning mechanism.

DESCRIPTION OF THE PREFERRED EMBODIMENTS

Hereinafter, an embodiment will be described with reference to the drawings.

Figures 1A, 1B:
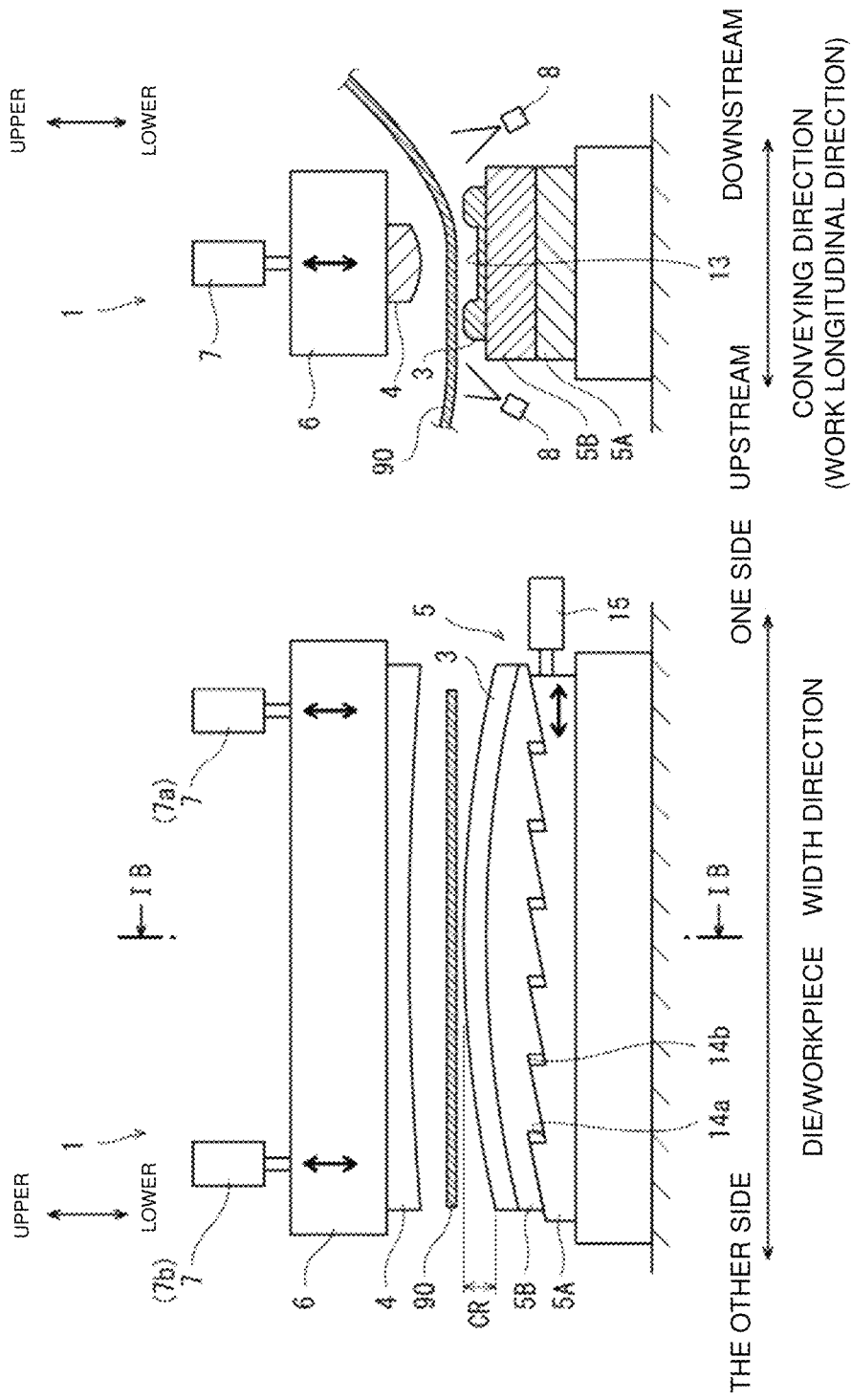
FIG. 1A is a front view of a press brake according to an embodiment.
FIG. 1B is a sectional view of the press brake taken along line IB-IB of FIG. 1A.
Figure 2:
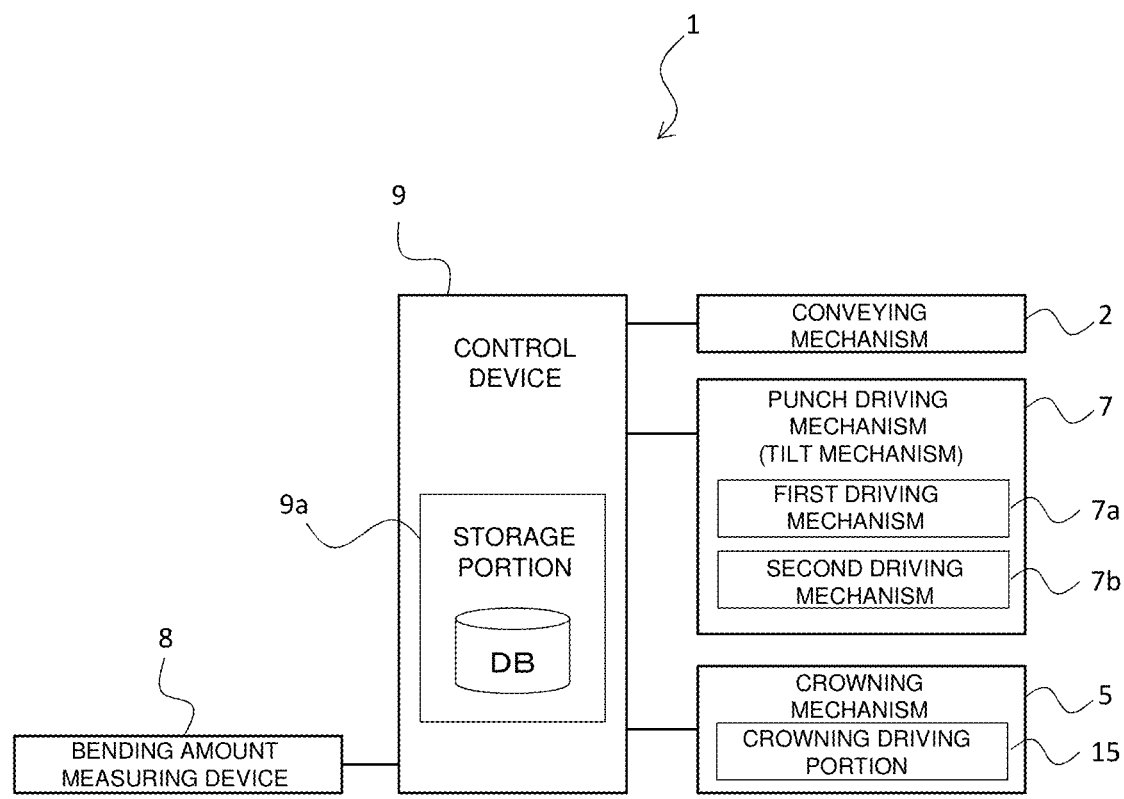
FIG. 2 is a block diagram showing a functional configuration of the press brake.

FIG. 1A is a front view of a press brake 1 according to the embodiment. FIG. 1B is a sectional view of the press brake 1 taken along line IB-IB of FIG. 1A. FIG. 2 is a block diagram showing a functional configuration of the press brake 1 according to the embodiment.

The press brake 1 shown in FIG. 1 and FIG. 2 can perform multistage bending with respect to a plate-shaped workpiece 90 that is long and wide. By combining the workpieces 90 subjected to the multistage bending, a circular tube body having a relatively large diameter can be formed. One example of such circular tube body is a skin of an aircraft body portion.

The press brake 1 includes a conveying mechanism (conveying device) 2, a die 3, a punch 4, a crowning mechanism (crowning device) 5, a punch supporting portion 6, a punch driver (punch driving device) 7, a bending amount measuring device 8, and a control device 9.

The conveying mechanism 2 intermittently conveys the workpiece 90 in a conveying direction (work longitudinal direction). A specific configuration of the conveying mechanism 2 is not especially limited. The conveying mechanism 2 may be comprised by a conveyor, a robot including a hand at a tip of a robot arm, or the like. The die 3 includes a groove portion 13 having a U-shaped section, a V-shaped section, or the like in a short-length direction. According to need, urethane or the like may be disposed between the die 3 and the workpiece 90, or a plate with which the workpiece 90 is brought into contact may be disposed.

In the press brake 1 shown in FIG. 1A and FIG. 1B, the "conveying direction" of the workpiece 90 and a "die longitudinal direction" are within a horizontal plane and are orthogonal to each other. Moreover, in the present embodiment, the workpiece 90 is placed on the press brake 1 such that at least in the vicinity of a portion supported by the die 3, a longitudinal direction of the workpiece 90 coincides with the conveying direction (see FIG. 1B), and a width direction of the workpiece 90 coincides with the die longitudinal direction (see FIG. 1A). Furthermore, the punch 4 is located so as to be opposed to the die 3 in a direction orthogonal to both the conveying direction and the die longitudinal direction. In the present embodiment, this opposing direction is an "upper-lower direction," and the punch 4 is arranged above the die 3.

Therefore, the groove portion 13 of the die 3 has a groove shape that is open upward as shown in FIG. 1B, and extends in the die longitudinal direction at an upper portion of the die 3. The sectional shape of the groove portion 13, the dimension of the opening portion in the conveying direction, the depth of the opening portion, and the like are suitably selected.

The punch 4 is supported by a lower portion of the punch supporting portion 6 arranged above the die 3 and is opposed to the die 3 in the upper-lower direction. The punch driver 7 moves the punch supporting portion 6 and the punch 4, supported by the punch supporting portion 6, relative to the die 3 in the upper-lower direction. The punch driver 7 includes a first driver (first driving device) 7a and a second driver (second driving device) 7b which are separated from each other in the die longitudinal direction. As one example, each of the first driver 7a and the second driver 7b may be comprised by a hydraulic cylinder arranged such that a rod thereof is directed in the upper-lower direction. In this case, the first driver 7a and the second driver 7b are comprised by separate hydraulic cylinders and can independently adjust stroke amounts (rod extension amounts).

The punch driver 7 is not limited to the combination of the first driver 7a and the second driver 7b described above. The punch driver 7 may include at least one electric servomotor and one feed screw. For example, the punch driver 7 include: a feed screw threadedly engaged with the punch supporting portion 6 such that a center axis of the feed screw extends in the upper-lower direction; and an electric servomotor that rotates the feed screw around the center axis. The punch driver 7 may include at least one electric servomotor and one link motion mechanism. For example, the punch driver 7 may include: a crank shaft extending above the punch supporting portion 6 in the die longitudinal direction; a link rod connecting an eccentric shaft of the crank shaft and the punch supporting portion 6; and an electric servomotor that rotates the crank shaft.

Moreover, the punch driver 7 may include at least one electric servomotor and one belt mechanism. For example, the punch driver 7 may include: lower pulleys connected to an upper portion of the punch supporting portion 6 and disposed along the die longitudinal direction; upper pulleys disposed above the lower pulleys; a belt wound around the lower pulleys and the upper pulleys; and an electric servomotor that winds and sends out the belt. In this case, when the electric servomotor winds and sends out the belt, the lower pulleys can be moved in the upper-lower direction relative to the upper pulleys. Furthermore, the punch driver 7 may include an electric servomotor and a hydraulic servomechanism and may move the punch supporting portion 6 in the upper-lower direction.

Therefore, by expanding or contracting the first driver 7a and the second driver 7b by the same stroke amount, the punch supporting portion 6 and the punch 4 can be moved in parallel in the upper-lower direction while maintaining the postures of the punch supporting portion 6 and the punch 4. Moreover, by expanding or contracting the first driver 7a and the second driver 7b such that the stroke amounts of the first driver 7a and the second driver 7b are different from each other, the postures (tilt amounts, tilt angles) of the punch supporting portion 6 and the punch 4 can be changed arbitrarily. Within the range of the stroke amount, the punch can stroke while being maintained in a horizontal state, and in addition, can incline (tilt) at an arbitrary angle. Therefore, the first driver 7a and the second driver 7b serve as not only punch drivers but also tilt mechanisms.

The die 3 is supported by the crowning mechanism 5. The amount (hereinafter "crowning amount CR") of upward projection of a middle portion of the die 3 in the die longitudinal direction relative to both end portions of the die 3 in the die longitudinal direction is changeable by the driving the crowning mechanism 5.

The crowning mechanism 5 is a mechanism that changes the crowning amount CR. The configuration of the crowning mechanism 5 is not especially limited. In the present embodiment, as one example, a known crowning mechanism using a wedge is adopted (see FIG. 1A). In this case, the crowning mechanism 5 includes a lower element 5A and an upper element 5B that are separated in the upper-lower direction. Then, saw teeth-shaped engaging portions 14a including sliding surfaces are formed on an upper surface of the lower element 5A, and saw teeth-shaped engaging portions 14b including sliding surfaces are formed on a lower surface of the upper element 5B. The sliding surfaces of the engaging portions 14a and the sliding surfaces of the engaging portions 14b are in contact with each other. Moreover, the tilt angles of the sliding surfaces of the engaging portions 14a are different from each other, and the tilt angles of the sliding surfaces of the engaging portions 14b are different from each other.

When the lower element 5A and the upper element 5B are moved such that the relative positions thereof deviate from each other in the die longitudinal direction, the upper element 5B can be partially moved relative to the lower element 5A in the upper-lower direction by the wedging action of the engaging portions 14a and 14b and the differences of the tilt angles of the sliding surfaces, and this can change the crowning amount CR. In addition to the lower element 5A including the engaging portions 14a and the upper element 5B including the engaging portions 14b, the crowning mechanism 5 further includes a crowning driving portion 15 that moves the lower element 5A or the upper element 5B in the die longitudinal direction. As one example, the crowning driving portion 15 is constituted by: a servomotor and a screw mechanism; or a hydraulic cylinder. As described above, the crowning driving portion 15 shown in FIG. 1 is one example. Another example may be such that: hydraulic cylinders supporting the die 3 from below are arranged in the longitudinal direction of the die 3; and the crowning amount CR is changed by adjusting expansion lengths of the hydraulic cylinders.

The bending amount measuring device 8 includes a sensor that measures the bending amount of the workpiece 90. As the bending amount of the workpiece 90, the bending amount measuring device 8 measures a middle bending amount and end bending amounts. The middle bending amount is a bending amount of a width direction middle portion of the workpiece 90, and the end bending amounts are bending amounts of width direction end portions of the workpiece 90. As the end bending amounts, the bending amount measuring device 8 measures a first end bending amount and a second end bending amount. The first end bending amount is a bending amount of a width direction first end portion of the workpiece 90, and the second end bending amount is a bending amount of a width direction second end portion of the workpiece 90. As the middle bending amount, the bending amount measuring device 8 may measure the bending amount of only one portion of the width direction middle portion of the workpiece 90 or may measure the bending amounts of plural portions of the width direction middle portion of the workpiece 90. In the present embodiment, as an example of the latter case, the bending amount measuring device 8 measures a first middle bending amount and a second middle bending amount. The first middle bending amount is a bending amount of a portion closer to a width direction first end than a width direction middle of the workpiece 90, and the second middle bending amount is a bending amount of a portion closer to a width direction second end than the width direction middle of the workpiece 90.

As above, the bending amount measuring device 8 measures the bending amounts of the workpiece 90 at the width direction portions of the workpiece 90. The bending amount measuring device 8 includes a single sensor and a scanning mechanism (scanning device) that moves the sensor in the die longitudinal direction. The single sensor scans the workpiece 90 to suitably measure the bending amounts of the portions of the workpieces 90. The bending amount measuring device may measure the bending amounts of the portions of the workpiece 90 by using plural sensors.

As the above single sensor or the above plural sensors, one sensor or plural sensors among a laser sensor, a line laser sensor, and a contact sensor may be adopted. When using the laser sensor and the line laser sensor, it is preferable to measure the bending amount by laser irradiation from a lower side or lateral side of the workpiece 90. When using the contact sensor, it is preferable to measure the bending amount by bringing a probe into contact with the workpiece 90 from a lower side or an upper side. For example, the above scanning mechanism may include: a linear guide, such as a rail, which guides a sensor; a belt to which the sensor is fixed and which reciprocates along the linear guide; and a servomotor that makes the belt reciprocate.

The "bending amount" measured by the bending amount measuring device 8 may be any value and is not especially limited as long as the bending amount is a measured value regarding a contour in the longitudinal direction of the workpiece and is an index by which the degree of the bending given to the workpiece 90 can be quantitatively evaluated. Examples of such index include: a curvature radius of the workpiece 90; an arc height corresponding to a circular arc between the two points away from each other in the longitudinal direction (circumferential direction) of the workpiece 90; and a bending angle of the workpiece 90.

As one example, the sensor constituting the bending amount measuring device 8 is arranged downstream of the die 3 in the conveying direction. In addition to this, another sensor may be arranged upstream of the die 3 in the conveying direction. In the present embodiment, the sensors are arranged downstream and upstream of the die 3 in the conveying direction (see FIG. 1B). In this case, the sensor at the upstream side is suitably used, for example, when considering the posture of the workpiece 90 for the correction of a detection value of the sensor at the downstream side, when measuring an initial bending amount of the workpiece 90, or when conveying the workpiece 90 in an opposite direction from the downstream side to the upstream side.

The control device 9 controls the conveying mechanism 2, the punch driver 7, and the crowning mechanism 5. In the present embodiment, especially, in accordance with the bending amounts measured by the bending amount measuring device 8, the control device 9 corrects the stroke amount of the punch driver 7, i.e., a pressing amount and tilt amount of the punch 4 with respect to the die 3 or the workpiece 90. Moreover, in accordance with the bending amount measured by the bending amount measuring device 8, the control device 9 corrects a movement amount of the crowning driving portion 15 of the crowning mechanism 5, i.e., the crowning amount CR.

The stroke amount and tilt amount of the punch driver 7 are corrected in accordance with the above bending amounts, i.e., the pressing amount of the punch 3 is corrected in accordance with the above bending amounts. For example, the stroke amount and tilt amount of the punch driver 7, i.e., the pressing amount of the punch 3 can be corrected especially in accordance the end bending amount (the bending amount of the width direction end portion of the workpiece 90). Positions at which the bending amounts to be referred at the time of the correction are measured may be any positions on the workpiece 90 and are, for example, positions at an end portion (especially a downstream end portion) of the workpiece 90 in the conveying direction. Moreover, a relation between the pressing amount and the bending amount differs depending on the thickness of the workpiece 90. Therefore, a storage portion 9a stores a database that defines a correspondence relation of the bending amounts with respect to the pressing amounts for each thickness.

Figure 3:
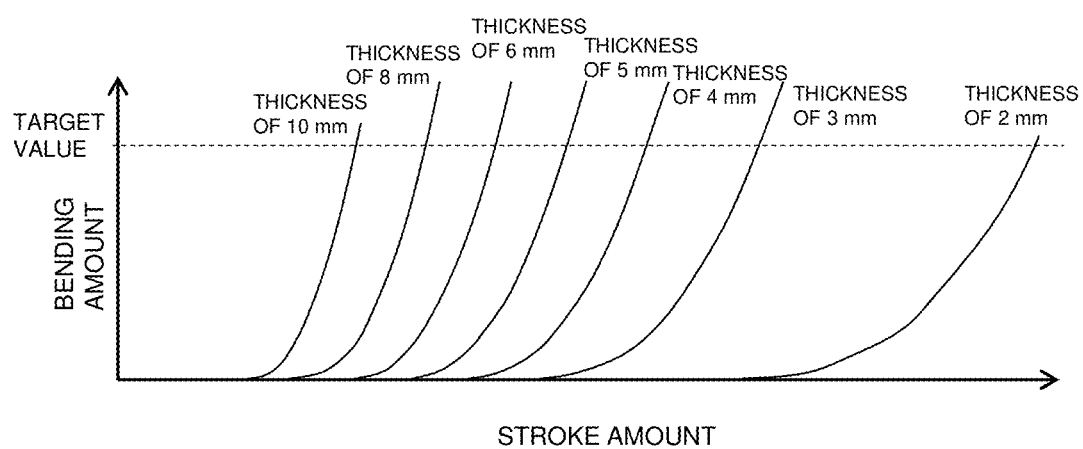
FIG. 3 is a graph for explaining contents stored in a database.

FIG. 3 is a graph for explaining contents of the database. As shown in FIG. 3, when subjecting the workpiece having a certain thickness to the bending, the bending amount increases as the pressing amount increases. Moreover, when subjecting the workpieces having thicknesses different from each other to the bending, the larger pressing amount is required for the workpiece having thinner thickness. This is because spring back characteristics of these workpieces differ due to the thickness difference. Furthermore, when performing the bending such that uniform bending amounts are given to the workpiece (workpiece having non-uniform thickness) whose thickness is partially non-uniform, the above tendency needs to be considered. In addition, when portions having respective thicknesses different from each other are adjacent to each other, rigidities of the portions influence each other. Therefore, further complex consideration is required to determine the most suitable pressing amount. Moreover, the degree of the above tendency and the degree of the influence differ depending on Young's modulus of the workpiece. The database of the relations between the bending amounts (bending angles) and the pressing amounts (stroke amounts) for various thicknesses is made, the relations having such tendency. The database is stored in the storage portion 9a. More specifically, a formula or a table by which the bending amount is acquired from the pressing amount is prepared in advance for each of Young's modulus, thickness, and situations, such as surrounding environment at the time of forming and a condition of the workpiece. These may be prepared by experience, experiments and/or simulation.

Moreover, the crowning amount CR is determined in accordance with a pressing load applied to the workpiece 90 and is corrected in accordance with a difference between the middle bending amount and an average value of the end bending amounts. A relation between the crowning amount and the bending amount changes in accordance with the thickness. As with FIG. 3, the storage portion 9a stores a database that defines a correspondence relation of the bending amount with respect to the crowning amount for each thickness.

Figure 4:
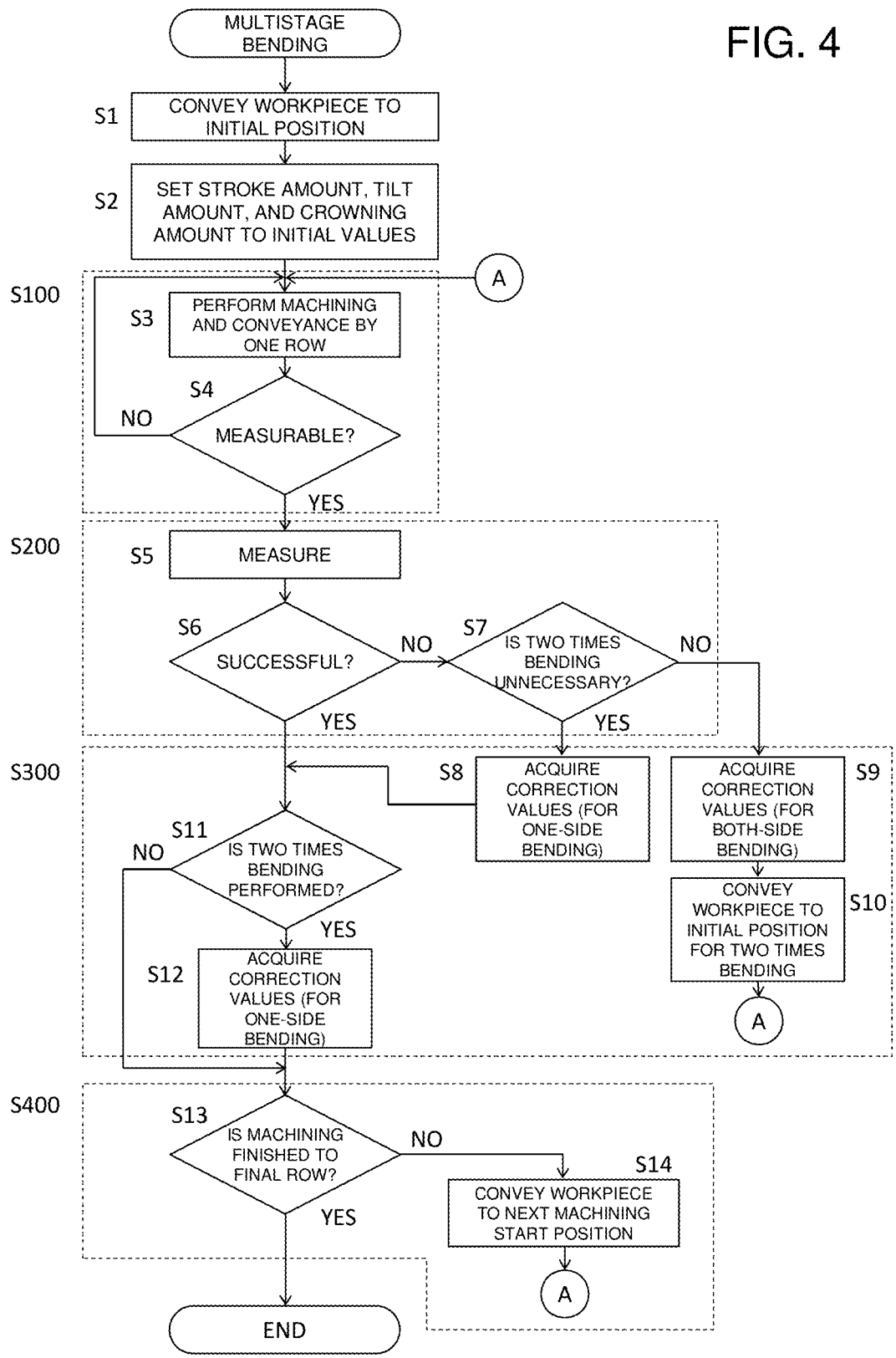
FIG. 4 is a flow chart showing control contents executed by a control device.

FIG. 4 is a flow chart of the multistage bending performed by the press brake 1 with respect to the workpiece 90, the multistage bending including the operation of correcting the stroke amount, the crowning amount, and the tilt amount by the control device 9. This operation includes a bending step (S100), a determining step (S200), a correcting step (S300), and a multistage bending step (S400) which are performed after the workpiece 90 is conveyed to an appropriate position. Hereinafter, the operation of the press brake 1 will be described.

As shown in FIG. 4, in the multistage bending of the workpiece 90, first, the workpiece 90 is conveyed to an initial position (S1). Typically, the workpiece 90 is conveyed such that the downstream end portion of the workpiece 90 in the conveying direction is located right under the punch 4. At the same time as the above conveyance or before or after the above conveyance, each of the stroke amount and tilt amount of the punch 4 and the crowning amount of the die 3 is set to a predetermined initial value (S2). For example, used as an example (first initial value example) of the initial value of the stroke amount may be such a value that it is expected from a sectional dimension of the pressed portion of the workpiece 90 that a target bending amount can be realized. Moreover, the stroke amount is set as the pressing amount by which the rear surface of the workpiece 90 is not brought into contact with the bottom of the groove portion 13 of the die 3. The above case where the rear surface of the workpiece 90 is not brought into contact with the bottom of the groove portion 13 of the die 3 denotes a case where the rear surface of the workpiece 90 is not directly brought into contact with the bottom of the groove portion 13, and examples of such case include: a case where urethane or the like is embedded in at least a part of the groove portion 13, and the rear surface of the workpiece 90 is brought into contact with this embedded portion; and a case where a bottom-contact die deforms mechanically or elastically.

The bending with respect to the end portion of the workpiece 90 in the conveying direction becomes excessive when Young's modulus is higher than an assumed value, or the thickness is thicker than an assumed value. In anticipation of this, an example (second initial value example) of the initial value of the stroke amount may be set to a value slightly smaller than such a value that it is expected that the target bending amount can be realized. For example, the initial value may be set to such a stroke amount that it is expected that the bending amount becomes around 90% (85% or more and 95% or less, for example) of the target bending amount.

Next, the bending step (S100) is executed. In the bending step (S100), the pressing of the workpiece 90 and the conveyance (S3) of the workpiece 90 are alternately and repeatedly performed until the pressed portion reaches a measurement range of the bending amount measuring device 8 (S4). To be specific, the pressing and the conveyance are repeated in order of the pressing of the punch 4, the conveyance of the workpiece 90, the stop of the conveyance, and the pressing of the punch 4. Like the above second initial value example, the initial value of the stroke amount is set such that the bending amount given to the workpiece 90 in the first bending step (S100) becomes slightly smaller than the target bending amount required for the final product. With this, excessive bending can be prevented. To be specific, the workpiece 90 is bent insufficiently as compared to a target value.

In the first bending step (S100), it is not essential to repeatedly perform the pressing and the conveyance (S3) until the pressed portion of the workpiece 90 reaches the measurement range. For example, after the pressing and the conveyance of the workpiece 90 (S3) are repeated a predetermined number of times, only the conveyance may be performed without performing the pressing such that the pressed portion of the workpiece 90 reaches the measurement range.

When the pressed portion of the workpiece 90 reaches the measurement range as above, the determining step (S200) is executed. In the determining step (S200), the bending amounts given to the workpiece 90 in the above bending step (S100) are measured (S5), and then, whether or not each of the measured bending amounts coincides with the target value (whether or not each of the measured bending amounts falls within a predetermined allowable range set based on the target value) is determined, i.e., whether each of the measured bending amounts is successful or unsuccessful is determined (S6). In the present embodiment, the bending amounts of four portions of the workpiece 90 are measured. Specifically, the bending amounts of four portions of the workpiece 90 are: the first end bending amount that is the bending amount of the first end portion in the die longitudinal direction; the second end bending amount that is the bending amount of the second end portion in the die longitudinal direction; the first middle bending amount that is the bending amount of the portion closer to the first end with respect to the middle portion in the die longitudinal direction; and the second middle bending amount that is the bending amount of the portion closer to the second end with respect to the middle portion in the die longitudinal direction.

In the measurement (S5) of the bending amounts, a shortage (differential value) of each measured bending amount from the target bending amount is also calculated. In the present embodiment, as one example, at least a part of the circular tube body is assumed to be formed from the workpiece 90. In other words, since the uniform bending amount is assumed to be given to the workpiece 90 regardless of the thickness, the position in the width direction, and the position in the longitudinal direction, the target bending amount is a single value. Then, in the present embodiment, a shortage (first end shortage) of the first end bending amount from the target bending amount, a shortage (second end shortage) of the second end bending amount from the target bending amount, a shortage (first middle shortage) of the first middle bending amount from the target bending amount, and a shortage (second middle shortage) of the second middle bending amount from the target bending amount are calculated.

In the present embodiment, as described above, in the first bending step (S100), the workpiece 90 is pressed by the stroke amount that is smaller than such a stroke amount that it is expected that the target bending amount can be realized. Therefore, in this case, the measurement value of the bending amount does not fall within the allowable range in the determining step (S200), and it is determined that the measurement value of the bending amount is unsuccessful (No in S6).

When it is determined that the measurement value of the bending amount is unsuccessful, the correcting step (S300) is executed. In the correcting step (S300), one of two types of operations is selected and executed in accordance with the degree of the unsuccessful value. Specifically, when the degree of the unsuccessful value is relatively low, i.e., when the measured bending amount of the pressed portion is such a bending amount that it is unnecessary to bend the pressed portion again, a first option is executed, i.e., the correction value for one side bending is acquired to perform the forming of a subsequent portion of the workpiece 90 without performing two times bending (S8). On the other hand, when the degree of the unsuccessful value is relatively high, i.e., when the measured bending amount of the pressed portion is such a bending amount that it is necessary to perform the bending again (two times bending), a second option is executed, i.e., the correction value for both side bending is acquired (S9), the conveyance of the workpiece 90 to the initial position for the two times bending is performed (S10) to perform the two times bending. Then, the above operations are performed again from Step S3 described above. A case where it is determined in Step S6 that the bending amount is successful will be described later.

As above, when it is determined in Step S6 of the determining step (S200) that the bending amount is insufficient (unsuccessful), the correction value for the one side bending (S8) or the correction value for the both side bending (S9) is acquired in the correcting step (S300) based on the shortage of the bending amount. Differences between the correction value for the one side bending and the correction value for the both side bending will be described with reference to FIG. 5.

Figure 5:
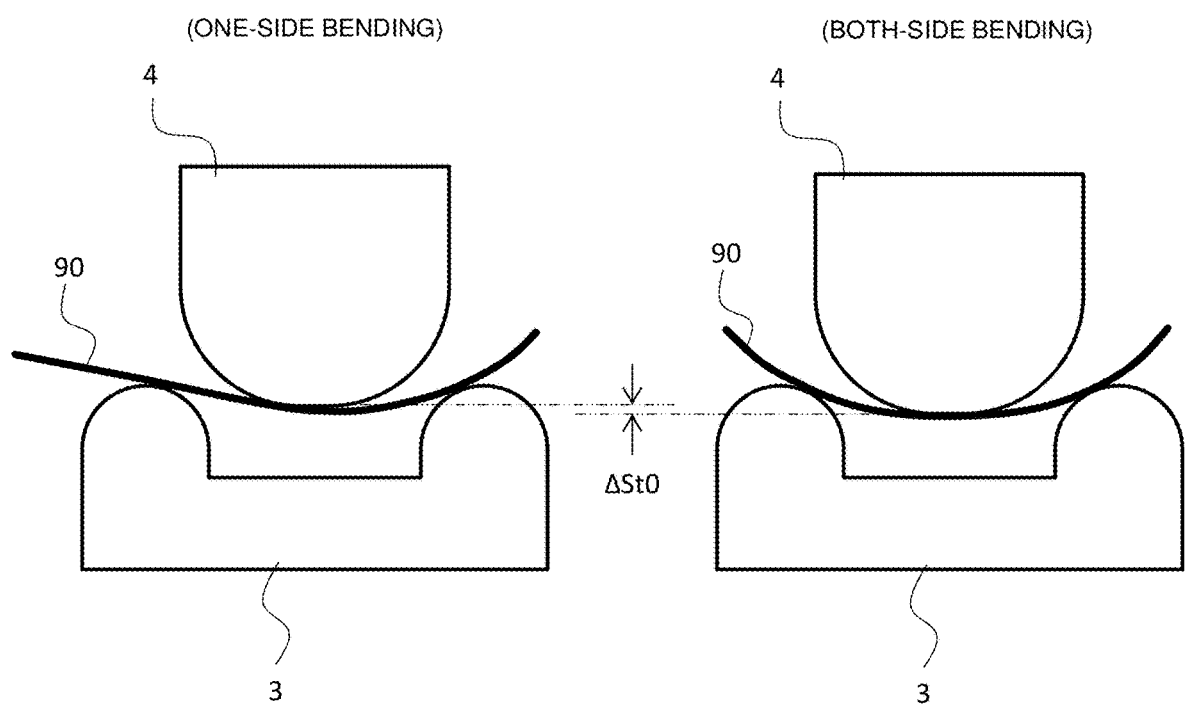
FIG. 5 is a schematic diagram for explaining that a correction value to be acquired changes in accordance with whether or not two times bending is required.

A left diagram in FIG. 5 shows that only a portion of the workpiece 90 which portion is located downstream of the pressed portion, pressed by the punch 4, in the conveying direction has already been subjected to the forming. The bending in this state is called "one side bending" for convenience sake. When subjecting a not-yet-formed portion of the workpiece 90 to the forming in order in the conveying direction, such forming is the "one side bending." On the other hand, a right diagram in FIG. 5 shows that both portions of the workpiece 90 which portions are respectively located downstream and upstream of the pressed portion, pressed by the punch 4, in the conveying direction have already been subjected to the forming. The bending in this state is called "both side bending" for convenience sake. When subjecting a portion, having already been subjected to the forming once, of the workpiece 90 to the two times bending, such forming is the "both side bending."

Even when the bending amount measured after the one side bending and the bending amount measured after the both side bending are the same as each other, the stroke amount of the punch 4 at the time of the one side bending and the stroke amount of the punch 4 at the time of the both side bending are different from each other by a difference ΔSt0 shown in FIG. 5. Therefore, the correction value is acquired by referring to a database corresponding to the one side bending or a database corresponding to the both side bending or referring to the same database in an offset manner in accordance with whether the next forming is the one side bending or the both side bending (S8, S9). In any case, the control device 9 refers to the database of the storage portion 9a to acquire correction amounts of the stroke amount, the crowning amount, and the tilt amount in accordance with the shortage of the measured bending amount, i.e., a differential correction amount of the measured value of the first driver 7a from the target value and a differential correction amount of the measured value of the second driver 7b from the target value, and based on these, the control device 9 corrects the stroke amount, the crowning amount, and the tilt amount.

As one example, the initial value of the first driver 7a is corrected in accordance with the first end shortage, and the initial value of the second driver 7b is corrected in accordance with the second end shortage. Moreover, the initial value of the crowning amount is corrected in accordance with a difference between the end shortage and the middle shortage. When the middle shortage of bending amount is larger than the end shortage of bending amount, the initial value of the crowning amount is corrected so as to be increased. When the middle shortage of bending amount is smaller than the end shortage of bending amount, the initial value of the crowning amount is corrected so as to be reduced. As the amount which is the shortage of bending amount of middle portion minus the shortage of bending amount of end portion increases, the correction amount to the initial value of the crowning amount increases.

In the present embodiment, the bending amounts are measured at two middle positions and two end positions. However, a method of deriving the middle shortage (or a representative value of the middle shortage) and the end shortage (or a representative value of the end shortage) is not especially limited. As one example, as the middle shortage that is the bending shortage of the die longitudinal direction middle portion, the control device 9 derives an average value, a maximum value, or a minimum value from the first middle shortage and the second middle shortage. As the end shortage that is the bending shortage of the die longitudinal direction end portion, the control device 9 derives an average value, a maximum value, or a minimum value from the first end shortage and the second end shortage.

Referring back to the flow chart of FIG. 4, when it is determined in Step S7 that the two times bending is necessary (No in S7), the correction value for the both side bending is acquired (S9), and the workpiece 90 is conveyed to the initial position for the two times bending (S10). To be specific, the workpiece 90 is conveyed such that a first forming target portion (first row) in the portion to be subjected to the two times bending is located right under the punch 4. Then, the two times bending is executed by performing Step S3 and the subsequent steps again. With this, the target bending amount can be surely given to the workpiece 90. Thus, high forming accuracy can be realized in partial bending.

In the flow chart of FIG. 4, after the two times bending (second bending step (S100)) is executed, the bending amount is measured again (determining step (S200)), and whether the measured value is successful or unsuccessful is determined (S6). Therefore, in accordance with the result of the successful-unsuccessful determination of the pressed portion after the two times bending is performed, Step 9 and the subsequent steps may be performed again according to need, and the bending (S100) may be executed. On the other hand, when it is estimated that the adequate forming accuracy can be secured by executing the second bending (S100), the determining step (S200) after the second bending (S100) may be omitted, and the next step may be performed.

Next, as a result of the bending (S100) performed once (i.e., the two times bending is not performed), when it is determined in Step S6 of the determining step (S200) that the measured bending amount coincides with the target value (i.e., the measured bending amount is successful) (Yes in S6), the multistage bending step (S400) is executed. To be specific, it is determined whether or not the formed range of the workpiece 90 has been subjected to the forming to the last, i.e., to the final row (No in S11; S13). When the formed range of the workpiece 90 has not yet been subjected to the forming (No in S13), the workpiece 90 is conveyed such that the next forming start position is located right under the punch 4 (S14), and Step S3 and the subsequent steps are performed again. When the formed range of the workpiece 90 has been subjected to the forming to the final row (Yes in S13), the multistage bending is terminated.

On the other hand, when it is determined that the measurement result after the two times bending is successful (Yes in S6), the correction value for the one side bending is acquired again (Yes in S11; S12) since the correction value for the both side bending is being set as the correction value of the punch 4. Then, as with the above, Step S13 and the subsequent steps are executed as the multistage bending step (S400). When the workpiece 90 has been subjected to the forming to the final row, the multistage bending is terminated.

When it is determined that the bending amount measured in Step S6 does not coincide with the target value (i.e., the bending amount measured in Step S6 is unsuccessful) (No in S6), and it is also determined that the two times bending is unnecessary since the degree of the unsuccessful value is low (Yes in S7), the correction value for the one side bending is acquired based on the database (S8). After that, as with the above, Step S13 and the subsequent steps are executed as the multistage bending step (S400). When the workpiece 90 has been subjected to the forming to the final row, the multistage bending is terminated.

Figure 6:
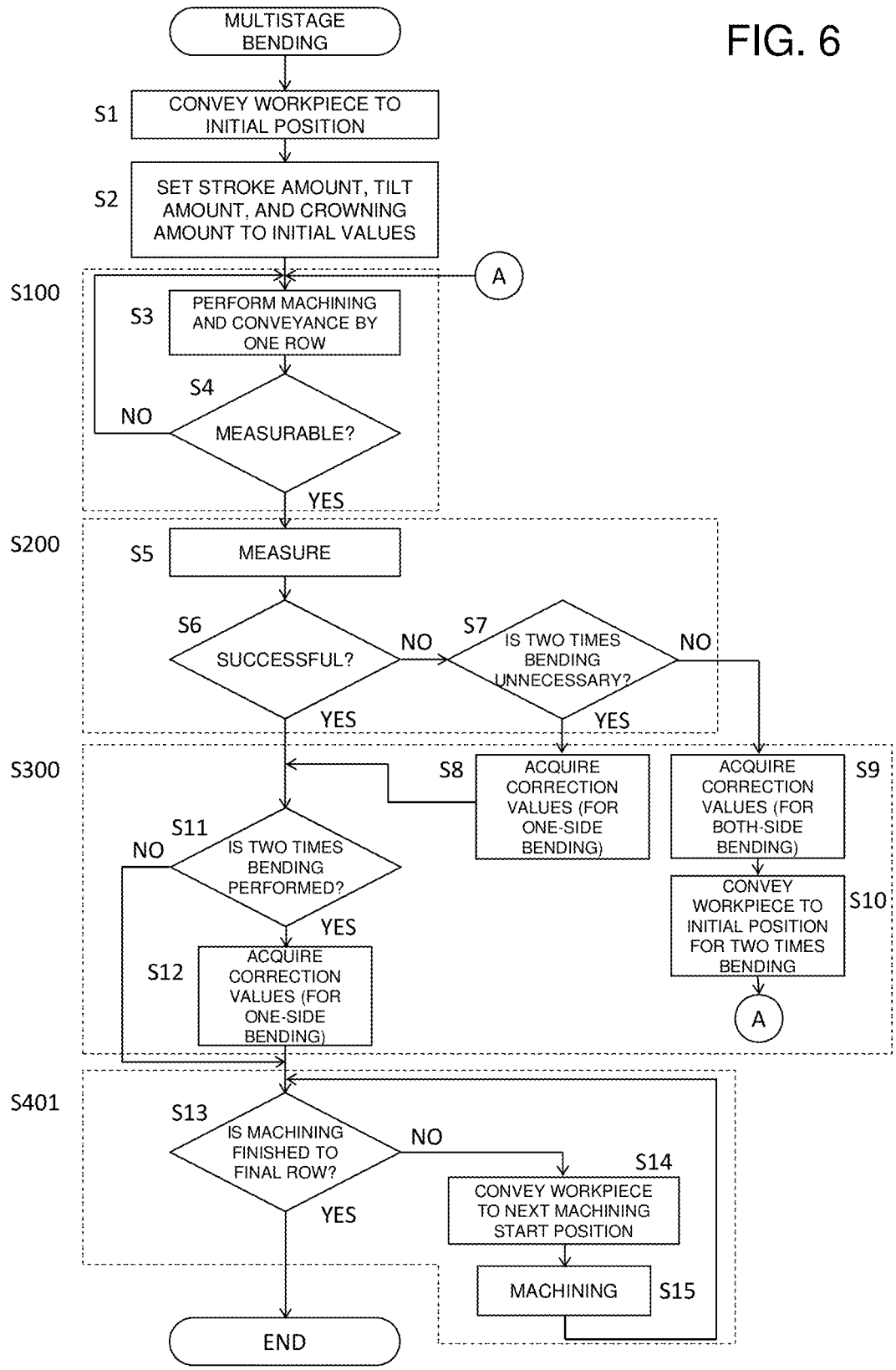
FIG. 6 is a flow chart showing different control contents executed by the control device.

The operations shown in FIG. 4 are operations in which: the bending amounts of all the formed portions of the workpiece 90 are basically measured after the forming; the successful-unsuccessful determinations regarding whether or not the bending amounts coincide with the target value are performed; and the two times bending is performed based on the results of the determinations according to need. However, the successful-unsuccessful determination may be performed with respect to the measured bending amount of only a portion of the workpiece 90 (typically, the downstream end portion of the workpiece 90 in the conveying direction) after the forming, and the remaining bending may be performed based on the correction value obtained from the result of the determination. To be specific, as shown in the multistage bending step (S401) of FIG. 6, when it is determined in Step S13 that the workpiece 90 has not yet been subjected to the forming to the final row (No in S13), the conveyance (S14) and forming (S15) of the workpiece 90 may be repeatedly performed until the forming of the final row is finished.

Moreover, the portion subjected to the successful-unsuccessful determination is not limited to one portion on the workpiece 90. The successful-unsuccessful determination may be performed for plural portions, and the correction value may be acquired each time the successful-unsuccessful determination is performed, and then, the stroke amount and the like may be corrected. For example, when the thickness of the workpiece 90 changes in the conveying direction, the correction based on the result of the successful-unsuccessful determination may be performed with respect to the vicinity of this changing portion in addition to the downstream end portion of the workpiece 90 in the conveying direction. Or, when the target bending amount of the workpiece 90 changes, the successful-unsuccessful determination based on the changed target bending amount may be additionally performed.

Moreover, after the bending step (S100) is performed with respect to the entire workpiece 90 once, the two times bending may be then performed with respect to necessary portions of the workpiece 90. In this case, while performing the bending step (S100) with respect to the entire workpiece 90, the determining step (S200) may be performed for respective portions of the workpiece 90, and the correction values of the portions subjected to the determination may be acquired in accordance with the results of the determination and stored in the storage portion 9a.

Figure 7A:
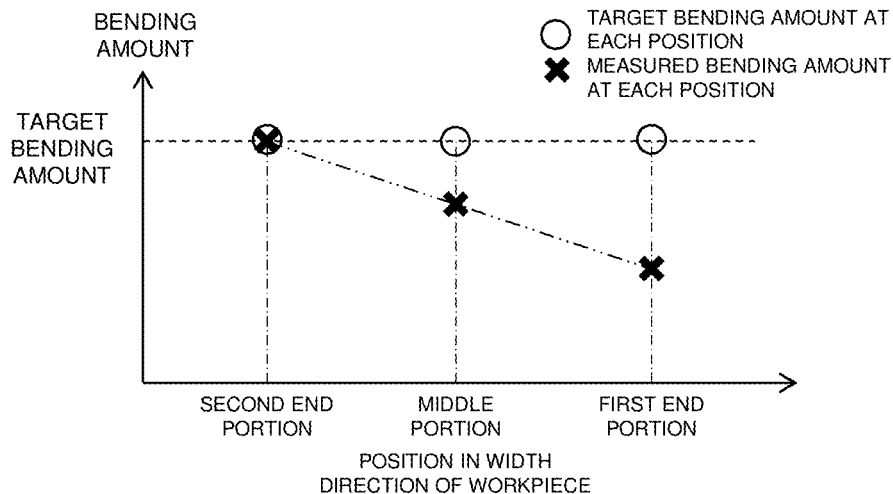
FIG. 7A to FIG. 7C are graphs in which a horizontal axis indicates the position of a workpiece in a width direction, and a vertical axis indicates a bending amount after a bending step is terminated.
Figure 7B:
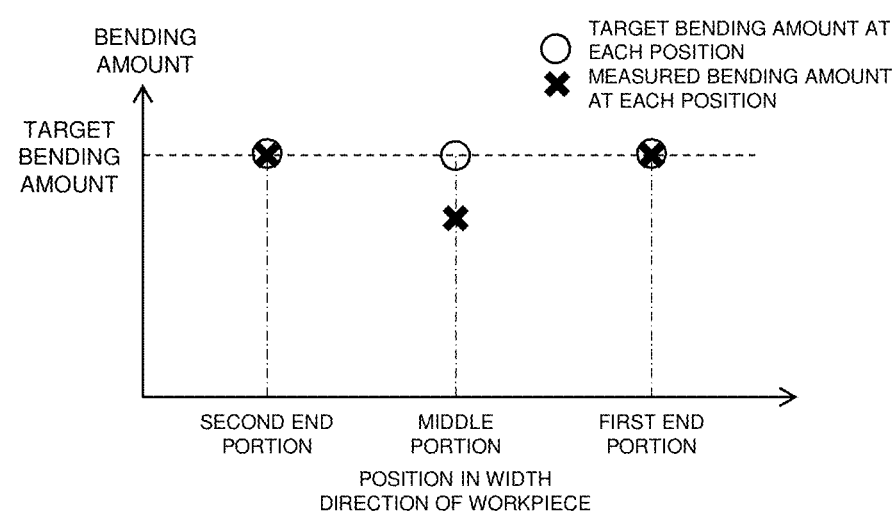
Figure 7C:
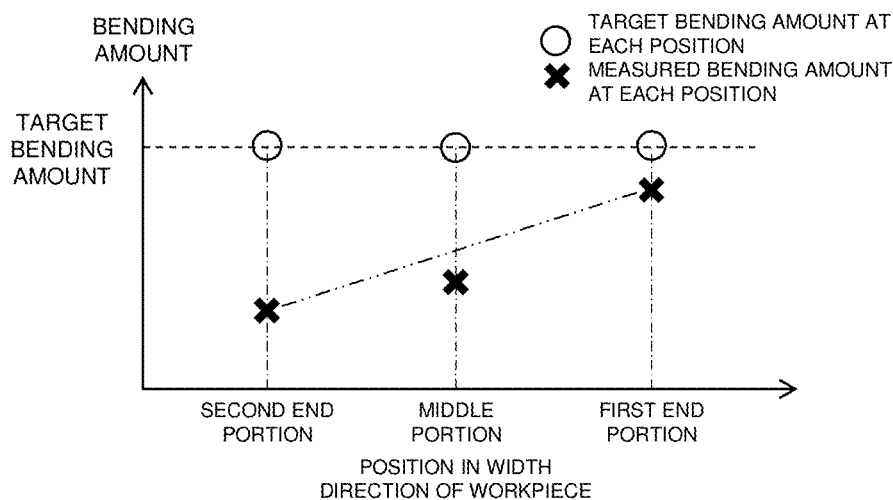
Figure 8A:
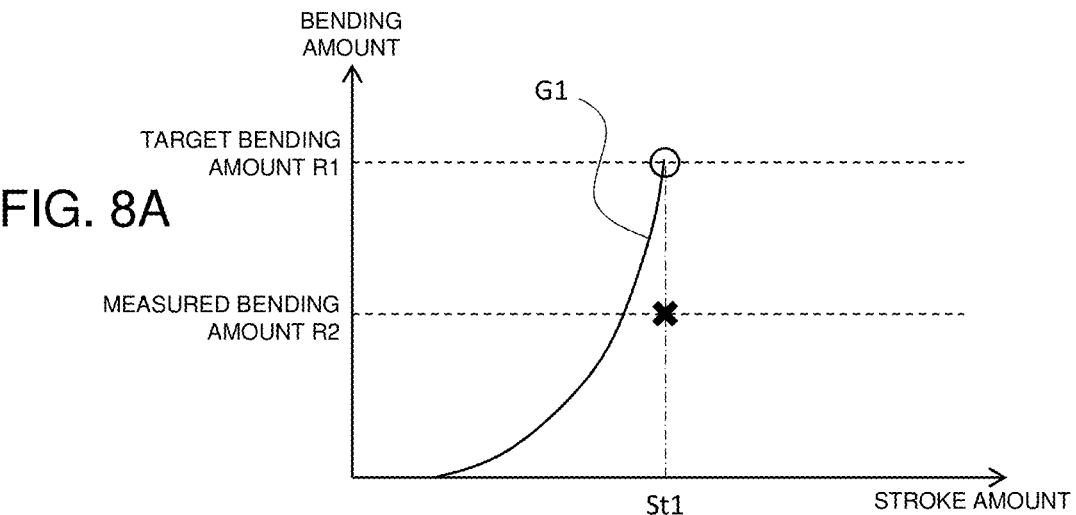
FIG. 8A and FIG. 8B are graphs for explaining a method of acquiring a correction value of a stroke amount and a correction value of a crowning amount with respect to a shortage of the bending amount.
Figure 8B:
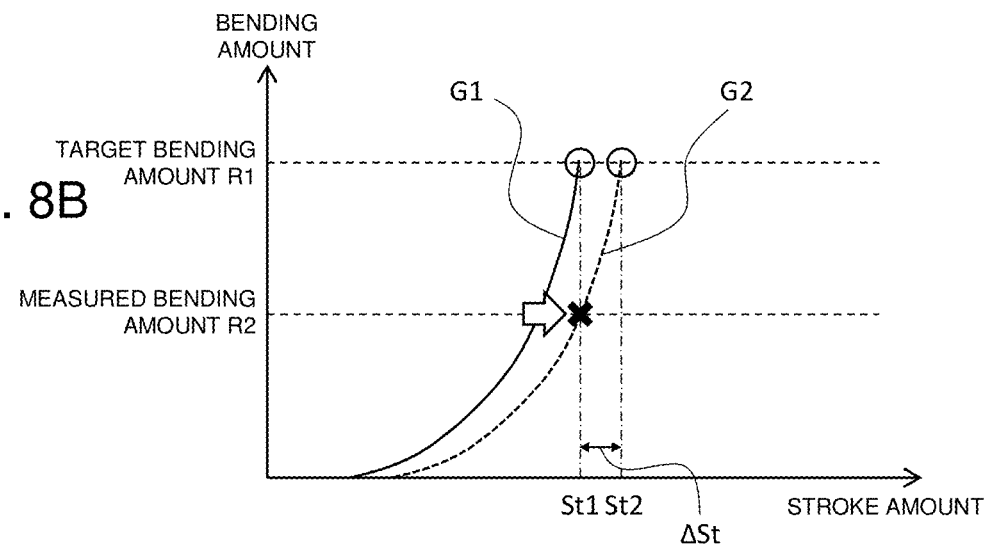

Next, the correction of the stroke amount (including a case of the tilting) and the correction of the crowning amount will be more specifically described with reference to FIG. 7A to FIG. 7C and FIG. 8A and FIG. 8B. FIG. 7A to FIG. 7C are graphs in which a horizontal axis indicates the position in the width direction of the workpiece 90, and a vertical axis indicates the bending amount (contour, bending angle) at the time of the measurement (S5). In each of FIG. 7A to FIG. 7C, the bending amounts of three positions that are the width direction first end portion, the width direction middle portion, and the width direction second end portion in the workpiece 90 are shown. FIG. 8A and FIG. 8B are graphs for explaining a method of acquiring the correction value of the stroke amount and the correction value of the crowning amount with respect to the shortage of the bending amount.

In the example shown in FIG. 7A, according to comparison between the target bending amount and the measured bending amount, the shortage of the bending amount uniformly increases in order of the second end portion, the middle portion, and the first end portion. At the second end portion, the measured bending amount coincides with the target bending amount. In this case, the entire posture of the punch supporting portion 6 is inclined (tilted) such that one end portion thereof approaches the die 3. To be specific, in this case, the stroke amount of the first driver 7a located at one end portion of the punch driver 7 is corrected so as to be increased, and the crowning amount does not have to be corrected.

Next, a specific example of the correction of the crowning amount will be described. A graph G1 shown in FIG. 8A indicates a relation between the stroke amount and the bending amount regarding a predetermined thickness and can be selected from the graphs of the respective thicknesses shown in FIG. 3. When selecting the graph, for example, regarding the first driver 7a that is a target whose stroke amount is corrected, a graph of the thickness in which the bending amount reaches a target bending amount R1 by a stroke amount St1 adopted at the time of the execution of the previous bending (S100) can be selected. The target bending amount R1 is a target value of the bending amount required for the portion subjected to the forming by the above punch 4 in the workpiece 90.

FIG. 8A shows that: the first driver 7a is driven by the stroke amount St1; and as a result, a bending amount R2 that is smaller than the target bending amount R1 is achieved at the first end portion of the workpiece 90. As above, when the measured bending amount R2 is smaller than the target bending amount R1, as shown in FIG. 8B, the graph G1 is substantially parallelly moved in a positive direction of the stroke amount until the graph G1 coincides with the stroke amount St1 and the bending amount R2. Thus, a graph G2 is prepared. Then, a differential value ΔSt between the stroke amount St2 corresponding to the target bending amount R1 on the graph G2 and the stroke amount St1 is acquired. The differential value ΔSt obtained as above can be used as the correction value of the stroke amount of the first driver 7a.

In the example shown in FIG. 7B, according to comparison between the target bending amount and the measured bending amount, the measured bending amount coincides with the target bending amount at each of the first end portion and the second end portion, but the measured bending amount is smaller than the target bending amount at the middle portion. In this case, the crowning amount of the middle portion of the die 3 is increased by the amount corresponding to ΔSt shown in FIG. 8B. To be specific, in this case, the crowning amount of the crowning mechanism 5 (crowning driving portion 15) is corrected so as to be increased, and the stroke amount of the punch driver 7 does not have to be corrected. As one example, as a method of acquiring the correction value of the crowning amount, a method similar to the above method explained with reference to FIG. 8A and FIG. 8B may be adopted.

Next, a specific example of the correction of the crowning amount and a specific example of the correction of the stroke amount (including a case of the tilting) will be described. In the example shown in FIG. 7C, according to comparison between the target bending amount and the measured bending amount, the measured bending amount is smaller than the target bending amount at each of the first end portion, the middle portion, and the second end portion. In addition, the shortage of the bending amount of the second end portion is larger than the shortage of the bending amount of the first end portion, and unlike FIG. 7A, the shortage of the bending amount does not change uniformly. To be specific, in the example shown in FIG. 7C, the stroke amount is insufficient entirely in the width direction, and both the tilt amount and the crowning amount preferred to be corrected. Therefore, in this case, the stroke amounts (and the tilt amounts) of the first driver 7a and the second driver 7b and the crowning amount of the die 3 which correspond to the portions where the stroke amount is insufficient may be corrected. The correction value of the stroke amount and the correction value of the crowning amount may be acquired based on the respective shortages by a method similar to the method explained with reference to FIG. 8A and FIG. 8B.

In the present embodiment, the bending amount measuring device 8 is arranged downstream of the die 3 in the conveying direction. However, the present embodiment is not limited to this. The bending amount measuring device 8 may be arranged inside the die, i.e., right under a place where the pressing is performed. For example, although the pressing and the conveyance of the workpiece are performed in the first bending step S100 in the flow chart of FIG. 4 (S3), the bending amount can be measured during the pressing by arranging the bending amount measuring device 8 inside the die. Therefore, the conveyance of the workpiece for the measurement is unnecessary.

According to the press brake configured as above, the distortion of the die, lower table, punch and punch supporting portion are corrected, and in addition, by compensating the amount of crowning (or tilt, if necessary) according to the amount of bending at the end of the workpiece, the system can reflect changes in the amount of springback that are caused by variations in the Young's modulus of the material from its nominal value or errors in the thickness from its nominal value. Therefore, in the entire multi stage forming after the forming of the edge portion, the above error can be corrected, thus the dimensional accuracy of the entire product improves.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The foregoing has described the embodiments, but the above configuration is merely one example. Modifications, additions, and/or eliminations may be suitably made within the scope of the present disclosure.

The present disclosure is applicable to a press brake that subjects a workpiece to bending.

What is claimed is:

1. A press brake that performs bending with respect to a workpiece by a die and a punch, the press brake comprising:
   the die that supports a rear surface of the workpiece;
   a punch that is arranged so as to be opposed to the die and moves in an upper-lower direction relative to the die to press a front surface of the workpiece;
   a crowning structure that has an upper piece and a lower piece that interlock together, the upper piece and the lower piece span across the die in a die longitudinal direction, and the crowning structure changes a crowning amount that is an amount of upward projection of a middle portion of the die relative to both end portions of the die in the die longitudinal direction;
   a bending amount measuring sensor that measures a middle bending amount and end bending amounts, the middle bending amount being a bending amount of a width direction middle portion of the workpiece, the end bending amounts being bending amounts of width direction end portions of the workpiece;
   a conveyor to convey the workpiece in a longitudinal conveying direction, wherein the longitudinal conveying direction and the die longitudinal direction of the die are within a horizontal plane and are orthogonal to each other; and
   processing circuitry, wherein:
   the processing circuitry is configured to acquire from the bending amount measuring sensor the middle bending amount and the end bending amounts of the workpiece that has been subjected to the bending by the die and the punch; and
   the processing circuitry is configured to control the crowning structure to correct the crowning amount in accordance with a difference between a shortage of the middle bending amount from a target bending amount and a shortage of each end bending amount from the target bending amount and drives the crowning structure; and
   the processing circuitry is configured to control the conveyor to control the workpiece to be conveyed to a bending position, drive the crowing structure based on the corrected crowning amount, and control the punch to press the workpiece in order to perform the bending again.

2. The press brake according to claim 1, further comprising a tilt driver that changes a tilt amount related to a tilt angle of the entire die or a tilt angle of the entire punch, wherein:
   the processing circuitry is configured to acquire from the bending amount measuring sensor the end bending amounts of both of the end portions of the workpiece that has been subjected to the bending by the die and the punch; and
   the processing circuitry is configured to correct the tilt amount in accordance with a difference between the shortages of the end bending amounts from the target bending amounts and drive the tilt driver.

3. The press brake according to claim 1, wherein:
   the processing circuitry is configured to acquire from the bending amount measuring sensor the end bending amounts of the workpiece that has been subjected to the bending by the die and the punch; and the processing circuitry is configured to correct a pressing amount of the punch with respect to the workpiece in accordance with the shortages of the end bending amounts from the target bending amounts and drives the punch.

4. The press brake according to claim 1, further comprising a punch driver including a first driver that drives in the upper-lower direction the punch at one end portion in the die longitudinal direction and a second driver that drives in the upper-lower direction the punch at the other end portion in the die longitudinal direction, wherein:

the processing circuitry is configured to acquire a first end bending amount and a second end bending amount from the bending amount measuring sensor, the first end bending amount being a bending amount of a width direction first end portion of the workpiece that has been subjected to the bending by the die and the punch, the second end bending amount being a bending amount of a width direction second end portion of the workpiece that has been subjected to the bending by the die and the punch;

the processing circuitry is configured to determine an operation amount of the first driver in accordance with a shortage of the first end bending amount from the target bending amount; and the processing circuitry is configured to determine an operation amount of the second driver in accordance with a shortage of the second end bending amount from the target bending amount.

5. A method of controlling a press brake, the press brake including:

a die;

a punch that is arranged so as to be opposed to the die and moves in an upper-lower direction relative to the die to press a front surface of the workpiece;

a crowning structure that has an upper piece and a lower piece that interlock together, the upper piece and the lower piece span across the die in a die longitudinal direction, and the crowning structure changes a crowning amount that is an amount of upward projection of a middle portion of the die relative to both end portions of the die in the die longitudinal direction; and a conveyor to convey the workpiece in a longitudinal conveying direction, wherein the longitudinal conveying direction and the die longitudinal direction of the die are within a horizontal plane and are orthogonal to each other, the method comprising:

pressing the workpiece by the punch to perform bending;

conveying, by the conveyor, the pressed workpiece;

acquiring a middle bending amount and end bending amounts, the middle bending amount being a bending amount of a width direction middle portion of the pressed workpiece pressed by the punch, the end bending amounts being bending amounts of width direction end portions of the pressed workpiece pressed by the punch;

correcting the crowning amount in accordance with a difference between a shortage of the middle bending amount from a target bending amount and a shortage of each end bending amount from a target bending amount; and conveying, by the conveyor, the workpiece to a bending position, driving the crowning structure based on the corrected crowning amount, and pressing the workpiece by the punch to perform the bending again.

6. The method according to claim 5, wherein:

the press brake further includes a tilt driver that changes a tilt amount related to a tilt angle of the entire die or a tilt amount of the entire punch;

the method further includes correcting the tilt amount in accordance with shortages of the end bending amounts of both of the end portions of the workpiece from the target bending amounts; and the step of performing the bending again further includes driving the tilt driver based on the corrected tilt amount and pressing the workpiece by the punch in accordance with the shortages of the end bending amounts of both of the end portions of the workpiece from the target bending amounts to perform the bending again.

7. The method according to claim 5, wherein the step of performing the bending again further includes correcting a pressing amount of the punch with respect to the workpiece in accordance with the shortages of the end bending amounts from the target bending amounts and driving the punch.

8. A method of controlling a press brake, the press brake including:

a die;

a punch that is arranged so as to be opposed to the die and moves in an upper-lower direction relative to the die to press a front surface of the workpiece;

a crowning structure that has an upper piece and a lower piece that interlock together, the upper piece and the lower piece span across the die in a die longitudinal direction, and the crowning structure changes a crowning amount that is an amount of upward projection of a middle portion of the die relative to both end portions of the die in the die longitudinal direction; and a conveyor to convey the workpiece in a longitudinal conveying direction, wherein the longitudinal conveying direction and the die longitudinal direction of the die are within a horizontal plane and are orthogonal to each other, the method comprising:

pressing the workpiece by the punch to perform bending;

conveying, by the conveyor, the pressed workpiece;

acquiring a middle bending amount and end bending amounts, the middle bending amount being a bending amount of a width direction middle portion of the pressed workpiece pressed by the punch, the end bending amounts being bending amounts of width direction end portions of the pressed workpiece pressed by the punch;

correcting the crowning amount in accordance with a difference between a shortage of the middle bending amount from a target bending amount and a shortage of each end bending amount from a target bending amount;

conveying, by the conveyor, the workpiece to a bending position, driving the crowning structure based on the corrected crowning amount, and pressing the workpiece by the punch to perform the bending again; and in a first bending by the die and the punch, setting an initial value of a stroke amount of the punch to a value smaller than such a value that it is expected that the target bending amount can be realized.

\* \* \* \* \*